(12) United States Patent
Yoneda

(10) Patent No.: US 6,313,965 B1
(45) Date of Patent: Nov. 6, 2001

(54) CHASSIS FOR MOUNTING A MECHANISM SUCH AS A VIDEO CASSETTE RECORDER

(75) Inventor: Haruhiko Yoneda, Daito (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/273,525

(22) Filed: Mar. 22, 1999

(30) Foreign Application Priority Data

Mar. 24, 1998 (JP) .................................................. 10-076200

(51) Int. Cl.[7] .................................................. G11B 33/12
(52) U.S. Cl. .................................................. 360/84
(58) Field of Search .................................. 360/84, 85, 90

(56) References Cited

U.S. PATENT DOCUMENTS

| | | | |
|---|---|---|---|
| 4,930,028 | * 5/1990 | Kunimaru et al. | 360/85 |
| 5,099,369 | * 3/1992 | Kakuta et al. | 360/85 |
| 5,419,629 | * 5/1995 | Korinsky | 312/263 |
| 5,442,502 | * 8/1995 | Shimizu | 360/99.02 |
| 5,519,270 | * 5/1996 | Yamada et al. | 310/67 R |
| 5,717,540 | * 2/1998 | Ishikawa et al. | 360/96.5 |
| 5,801,898 | * 9/1998 | Okuie et al. | 360/85 |
| 5,847,485 | * 12/1998 | Suzuki et al. | 310/257 |
| 5,870,248 | * 2/1999 | Akutsu et al. | 360/99.04 |
| 5,875,068 | * 2/1999 | Sawada | 360/99.01 |
| 6,172,842 | * 1/2001 | Satoh et al. | 360/97.01 |

FOREIGN PATENT DOCUMENTS

| | | |
|---|---|---|
| 61-20248 | * 1/1986 | (JP) . |
| 61-20286 | * 1/1986 | (JP) . |
| 11-186750 | * 7/1999 | (JP) . |

* cited by examiner

*Primary Examiner*—Brian E. Miller
(74) *Attorney, Agent, or Firm*—Armstrong, Westerman, Hattori, McLeland & Naughton, LLP

(57) ABSTRACT

A mechanism chassis 1 comprises a polygonal flat plate portion 11 for arranging a plurality of mechanisms on a surface of thereof, and a plurality of side plate portions 12, 13, 14, 15 bent from the respective contour sides of the flat plate portion 11 toward a rear side of the flat plate portion 11. The flat plate portion 11 has a high-precision chassis region where those of the mechanisms of which a relatively high precision is required are to be arranged, and a high-strength chassis region where others of the mechanisms are to be arranged satisfactorily with a relatively low precision. The pair of side plate portions adjacent to each other at each corner included in the high-precision chassis region are separated from each other, and the pair of side plate portions adjacent to each other at each corner included in the high-strength chassis region are joined to each other.

2 Claims, 3 Drawing Sheets

CHASSIS FOR MOUNTING A MECHANISM SUCH AS A VIDEO CASSETTE RECORDER

FIELD OF THE INVENTION

The present invention relates to a mechanism chassis for mounting a plurality of mechanisms thereon for use in devices, such as VCRs (video cassette recorders), having these mechanisms to realize a specified operation.

BACKGROUND OF THE INVENTION

FIG. 4 shows a mechanism chassis 10 which is conventionally used in VCRs. The mechanism chassis 10 comprises a polygonal flat plate portion 11 for mounting on the surface thereof mechanisms such as a rotary head cylinder, a capstan, a pair of reel supports, and four side plate portions 12, 13, 14, 15 bent from the respective contour sides of the flat plate portion 11 toward the rear side of the plate portion 11. The flat plate portion 11 is formed with an opening 16 for mounting the rotary head cylinder, and loading grooves 17, 18 for mounting respective leading guide blocks for winding a magnetic tape around the rotary head cylinder.

To make the mechanism chassis 10, a blank having the contour of the chassis 10 of FIG. 4 as developed on a plane is cut out from a metal sheet having a thickness, for example, of 1.6 mm, and the blank is thereafter pressed to bend four side plate portions 12, 13, 14, 15 extending from a flat plate portion 11. A strain due to residual stress or the like will occur in the mechanism chassis 10 resulting from the press work, undulating the surface of the flat plate portion 11.

Accordingly, the bulging-out parts and the curving-in parts of the surface undulations of the flat plate portion 11 are reversely deformed, eventually using a leveler to correct the flatness of the flat plate portion 11. In this step, the mechanism chassis 10 has a sufficient thickness and therefore high rigidity, whereas the four side plate portions 12, 13, 14, 15, which are separated from one another, are free to deform at the separated portions B, so that the strain of the mechanism chassis 10 can be removed correctly by the eventual leveling work. As a result, the mechanism chassis 10 obtained has a high degree of flatness over the surface of the flat plate portion 11.

Mechanisms of simpler construction have been developed in recent years to provide compacted VCRs of reduced weight. It is required that the mechanism chassis 10 be prepared also from a metal sheet of the smallest possible thickness.

However, if the sheet thickness of the mechanism chassis 10 is reduced excessively a lower structural strength will result, readily entailing deformation due to the action of an external force and consequently leading to the malfunctioning of mechanisms on the chassis 10. Conventionally, therefore, there is a lower limit to the sheet thickness of the mechanism chassis 10, and difficulty is encountered in reducing the weight of the mechanism chassis 10.

SUMMARY OF THE INVENTION

An object of the present invention is to provide a mechanism chassis of reduced weight by making the chassis from a metal sheet having a smaller thickness than in the prior art.

The present invention provides a mechanism chassis comprising a polygonal flat plate portion 11 having a plurality of contour sides and a plurality of corners formed by intersection of the contour sides for arranging a plurality of mechanisms on a surface of the flat plate portion, and a plurality of side plate portions 12, 13, 14, 15 bent from the respective contour sides of the flat plate portion 11 toward a rear side of the flat plate portion 11, the mechanism chassis being characterized in that the pair of side plate portions adjacent to each other at at least one corner are separated from each other, the pair of side plates portions adjacent to each other at the corner or each of the corners other than said at least one corner being joined to each other.

According to the installation precision required for mounting the plurality of mechanisms on the flat plate portion 11 of the mechanism chassis of the invention, the flat plate portion 11 is divided into two regions, i.e., a chassis region where those of the mechanisms of which a relatively high precision is required are to be arranged (hereinafter referred to as the "high-precision chassis region"), and a chassis region where others of the mechanisms are to be arranged satisfactorily with a relatively low precision (hereinafter referred to as the "high-strength chassis region") In this case, the chassis is so shaped that the pair of side plate portions adjacent to each other at at least one corner included in the high-precision chassis region are separated from each other, and that the pair of side plate portions adjacent to each other at at least one corner included in the high-strength chassis region are joined to each other.

The structure wherein one pair of side plate portions are separated can be realized by cutting out a metal sheet blank in a shape including a flat plate portion and the two side plate portions as unfolded to the same plane as the flat plate portion, and thereafter bending the two side plate portions by press work. The structure wherein one pair of side plate portions are joined can be realized by subjecting the corresponding corner of the metal sheet blank to press work involving drawing.

In the process for making the mechanism chassis, at least one pair of side plate portions are separated in the high-precision chassis region, so that the residual stress resulting from the press work is mitigated at the separated portion, while the strain remaining after the press work can be corrected with a high precision in the same manner as in the prior art. This gives the high-precision chassis region a high degree of flatness. Consequently, when arranged in the high-precision region, the mechanisms of which a relatively high precision is required are capable of realizing an accurate operation.

On the other hand, the high-strength chassis region has a high structural strength since at least one pair of side plate portions are joined in this region, whereas this structure permits the press work to produce a residual stress to result in some strain. This strain is difficult to correct completely because of the high structural strength of the high-strength chassis region. However, no problem arises since the mechanisms of which a relatively low precision is required are arranged in the high-strength chassis region. The high structural strength rather imparts increased rigidity to the overall chassis, with the result that even if prepared from a metal sheet of smaller thickness than conventionally, the mechanism chassis is given a sufficient structural strength in its entirety.

For example, in the case of a mechanism chassis for mounting VCR mechanisms thereon, a high degree of flatness is required of a backward chassis region where the rotary head cylinder 2 and the capstan 5 are to be arranged. This region is therefore designed as the high-precision region. A forward chassis region where the pair of reel supports 3, 4 are to be arranged need not have a very high precision, and is accordingly designed as the high-strength chassis region.

The mechanism chassis of the present invention has satisfactory flatness and high structural strength in its entirety, can nevertheless be prepared from a thinner metal sheet than conventionally and is therefore reduced in weight.

DETAILED DESCRIPTION OF EMBODIMENTS

Figure 1:
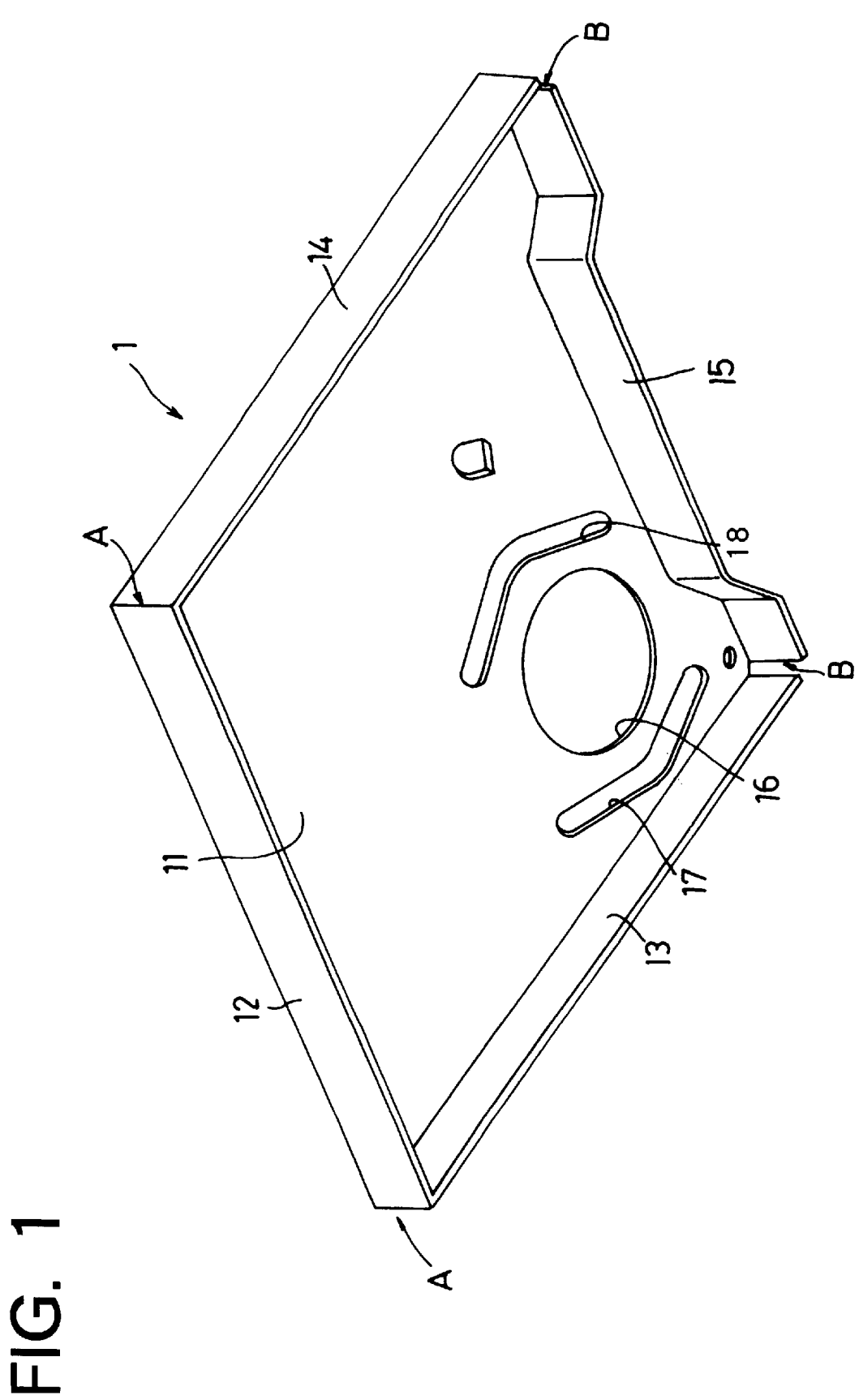
FIG. 1 is a perspective view of a mechanism chassis embodying the invention and as viewed from the rear side thereof.

The present invention as applied to a VCR will be described below in detail with reference to the drawings. The VCR embodying the invention and shown in FIG. 2 comprises a rotary head cylinder 2, leading guide blocks 21, 22 for winding a magnetic tape around the cylinder 2, a capstan 5, etc. which are arranged on a mechanism chassis 1 in a backward region thereof, and a supply reel support 3, take-up reel support 4, etc. which are arranged on the chassis in a forward region thereof.

As seen in FIG. 1, the mechanism chassis 1 comprises a flat plate portion 11 which is generally in the form of a quadrilateral, and a front side plate portion 12, left side plate portion 13, right side plate portion 14 and back side plate portion 15 which are bent from the respective corresponding contour sides of the flat plate portion 11 toward the rear side thereof. The flat plate portion 11 is formed with an opening 16 for mounting the rotary head cylinder 2, and loading grooves 17, 18 for mounting the guide blocks 21, 22. The back side plate portion 15 is separated from the two lateral side plate portions 13, 14 as in the prior art, but the front side plate portion 12 is joined to the side plate portions 13, 14.

The mechanism chassis 1 is made by pressing a metal sheet thinner than is conventionally used, e.g., a metal sheet having a thickness of 1.2 mm. The two separated portions B, B between the back side plate portion 15 and the two lateral side plate portions 13, 14 are formed by cutting the metal sheet into a blank shaped to include these side plate portions as developed and thereafter bending these side plate portions 13, 14, 15. Further the two joints A, A between the forward side plate portion 12 and the two lateral side plate portions 13, 14 are formed simultaneously with the separated portions B, B by subjecting the metal sheet blank to press work involving drawing. A strain due to residual stress or the like will occur in the mechanism chassis 1 resulting from the press work, somewhat undulating the surface of the flat plate portion 11.

Accordingly, the bulging-out parts and the curving-in parts of the surface undulations of the flat plate portion 11 are reversely deformed, eventually using a leveler to correct the flatness of the flat plate portion 11. In this step, the joints A, A permit the mechanism chassis 1 to exhibit a high structural strength, whereas at least the backward chassis region of the flat plate portion 11 can be finished to a high degree of flatness by the leveling work since the separated portions B, B are free to deform. The forward chassis region of the flat plate portion 11 can also be improved in flatness since a great strain can be corrected by the leveling work.

Figure 2:
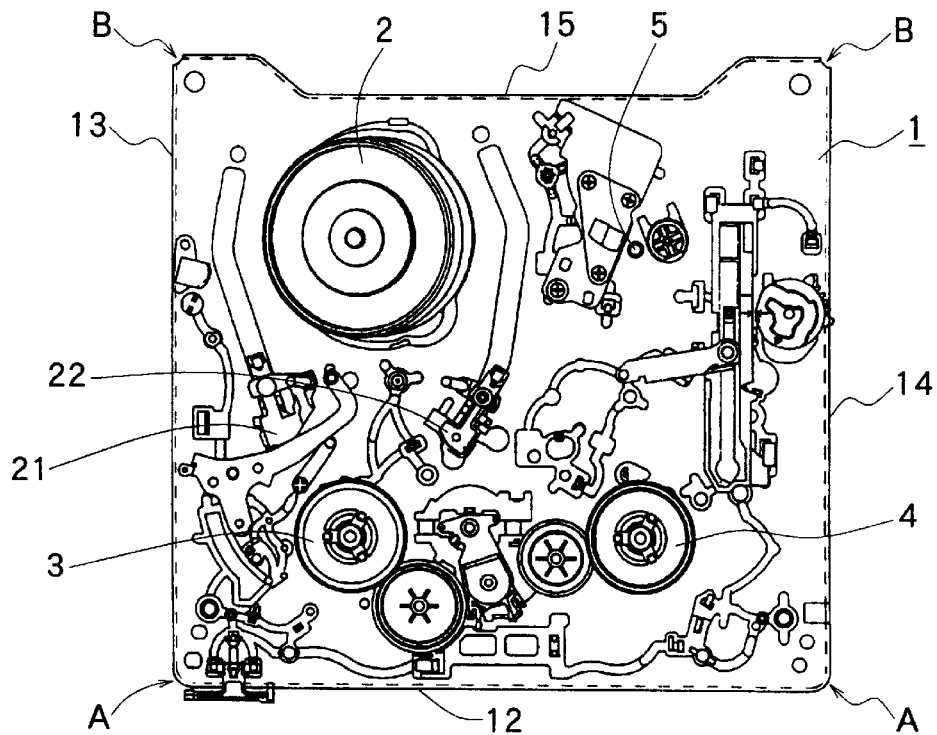
FIG. 2 is a plan view showing an arrangement of VCR components on the chassis of the invention.

Thus, the high degree of flatness is given to the backward chassis region where a tape running mechanism including the rotary head cylinder 2 and capstan 5 is disposed as shown in FIG. 2, realizing an accurate tape running path. On the other hand, the forward chassis region where the supply reel support 3 and the take-up reel support 4 are arranged is slightly lower than the backward chassis region in flatness, but the leveling work attains sufficient flatness required for the installation of the reel supports 3, 4.

In the mechanism chassis 1 embodying the present invention, the two joints A, A and the two separated portions B, B formed between the four side plate portions 12, 13, 14, 15 as described above provide a high-precision chassis region having a high degree of flatness although somewhat lower in structural strength and a high-strength chassis region conversely having a high structural strength although somewhat lower in flatness. Even if made from a metal sheet having a smaller thickness than conventionally, therefore, the mechanism chassis 1 can be given a sufficient structural strength and satisfactory flatness in its entirety and can consequently be reduced in weight.

Especially according to the embodiment of FIG. 2 wherein the backward chassis region of which a high degree of flatness is required has two separated portions B, B, and the forward chassis region which need not have a very high degree of flatness has two joints A, A, each region is provided with an appropriate degree of flatness in accordance with the characteristics of the particular mechanisms to be arranged therein. This serves to minimize the plate thickness of the mechanism chassis 1 while assuring each region of the required flatness.

Figure 3:
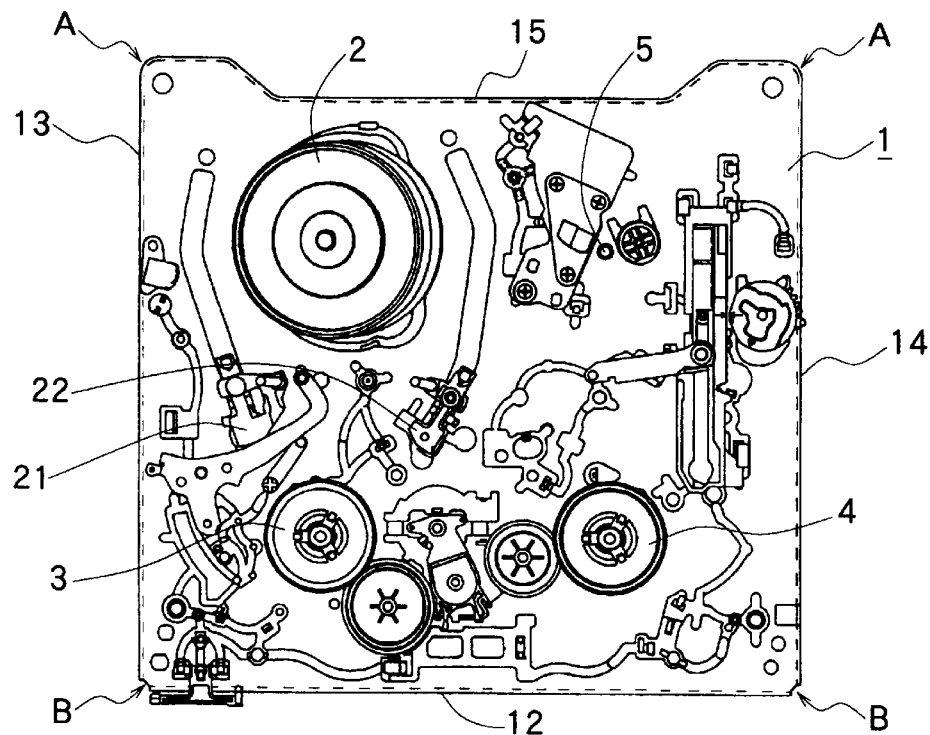
FIG. 3 is a plan view of the same arrangement on another embodiment of the invention.
Figure 4:
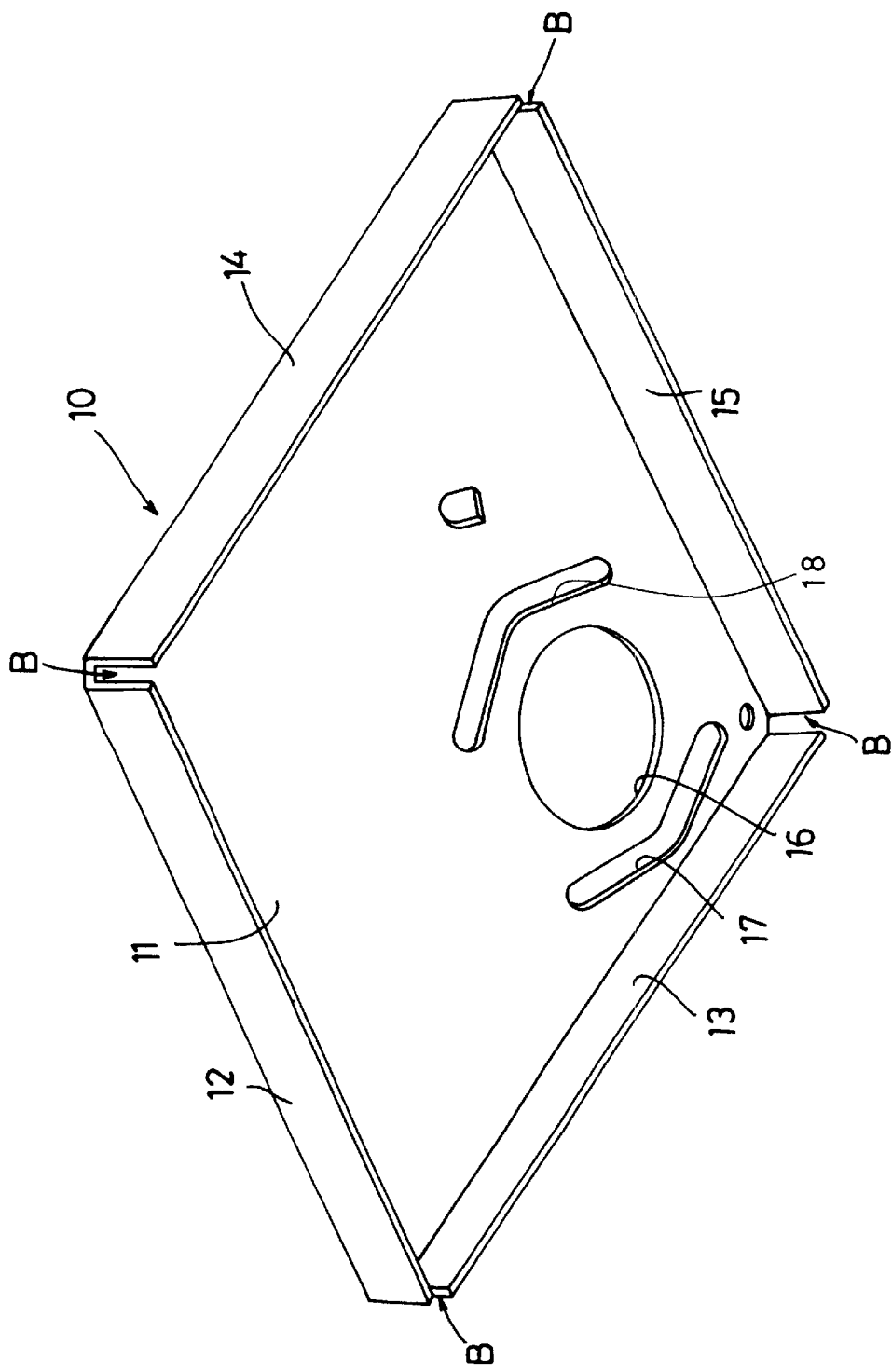
FIG. 4 is a perspective view of a conventional mechanism chassis as viewed from the rear side thereof.

As shown in FIG. 3, two separated portions B, B may be formed at the front side of the mechanism chassis 1, with two joints A, A formed at the back side. Even in this case, the chassis 1 is comparable in its entirety to that of FIG. 2 in structural strength and can therefore be smaller in plate thickness than in the prior art although the backward region is slightly lower in the degree of flatness than in the chassis 1 of FIG. 2.

The chassis of the invention is not limited to the foregoing embodiments in construction but can be modified variously without departing from the spirit of the invention as set forth in the appended claims. When the mechanism chassis 1 is generally quadrilateral, one joint and three separated portions, or three joints and one separated portions can be formed in the chassis. The chassis can then be made from a metal sheet having a smaller thickness than conventionally.

What is claimed is:

1. A chassis for a video cassette recorder made from a metal sheet for mounting a plurality of mechanisms thereon, the chassis comprising a polygonal that plate portion (11) having a plurality of contour sides and a plurality of corners formed by intersection of the contour sides for arranging the plurality of mechanisms on a surface of the flat plate portion, and a plurality of side plate portions (12, 13, 14, 15) bent from the respective contour side of the flat plate portion (11), toward a rear side of the flat plate portion (11), the pair of side plate portions adjacent to each other at at least one corner being separated from each other, the pair of side plate portions adjacent to each other at the corner or each of the corners other than said at least one corner being joined to each other, a said corner, that than said at least one corner, being joined to each other having continuous and seamless metal across the corner.

2. A chassis for a video cassette recorder according to claim 1 wherein the flat plate portion 11 has a backward chassis region where a rotary head cylinder 2 an a capstan 5 are to be arranged, and a forward chassis region where a pair of reel supports 3, 4 are to e arranged, the pair of side plate portions adjacent to each other at at least one corner included in the backward chassis region being separated from each other, the pair of side plate portions adjacent to each other at least one corner included in the forward chassis region being joined to each other.

* * * * *

UNITED STATES PATENT AND TRADEMARK OFFICE
CERTIFICATE OF CORRECTION

PATENT NO. : 6,313,965 B1
DATED : November 6, 2001
INVENTOR(S) : Haruhiko Yoneda It is certified that error appears in the above-identified patent and that said Letters Patent is hereby corrected as shown below:

Column 4,
Line 52, the word "that" should read -- flat --.
Line 57, the word "side" should read -- sides --.

Column 5,
Line 3, the word "an" should read -- and --.
Line 5, the word "e" should be -- be --.

Column 6,
Line 3, the word -- at -- should be inserted between the words "other" and "at".

Signed and Sealed this

Thirtieth Day of April, 2002

Attest:

Attesting Officer

JAMES E. ROGAN
Director of the United States Patent and Trademark Office